United States Patent
Matityahu et al.

(10) Patent No.: US 8,320,242 B2
(45) Date of Patent: Nov. 27, 2012

(54) ACTIVE RESPONSE COMMUNICATIONS NETWORK TAP

(75) Inventors: Eldad Matityahu, Palo Alto, CA (US); Robert E. Shaw, Los Gatos, CA (US); Stephen H. Strong, Fremont, CA (US); Dennis A. Carpio, San Jose, CA (US)

(73) Assignee: Net Optics, Inc., Santa Clara, CA (US)

( * ) Notice: Subject to any disclaimer, the term of this patent is extended or adjusted under 35 U.S.C. 154(b) by 662 days.

(21) Appl. No.: 11/174,033

(22) Filed: Jul. 1, 2005

(65) Prior Publication Data
US 2006/0153092 A1 Jul. 13, 2006

Related U.S. Application Data

(60) Provisional application No. 60/639,004, filed on Dec. 24, 2004.

(51) Int. Cl.
- *G01R 31/08* (2006.01)
- *H04B 1/56* (2006.01)
- *G06F 15/173* (2006.01)
- *G06F 15/16* (2006.01)

(52) U.S. Cl. ........ 370/230; 370/235; 370/276; 709/224; 709/232

(58) Field of Classification Search .......... 370/230, 370/235, 236, 276, 293–295, 401–402; 709/223–226, 230–233
See application file for complete search history.

(56) References Cited

U.S. PATENT DOCUMENTS

| | | | |
|---|---|---|---|
| 4,802,161 A | 1/1989 | Byars et al. | |
| 5,173,794 A | 12/1992 | Cheung et al. | |
| 5,539,727 A | 7/1996 | Kramarczyk et al. | |
| 5,550,802 A | 8/1996 | Worsley et al. | |
| 5,648,965 A | 7/1997 | Thadani et al. | |
| 5,696,859 A | 12/1997 | Onaka et al. | |

(Continued)

FOREIGN PATENT DOCUMENTS

JP 2001-197066 A 7/2001

(Continued)

OTHER PUBLICATIONS

"U.S. Appl. No. 11/965,668", Filing Date: Dec. 27, 2007.

(Continued)

*Primary Examiner* — Michael Thier
*Assistant Examiner* — Redentor Pasia
(74) *Attorney, Agent, or Firm* — IPSG, P.C. Intellectual Property Law

(57) ABSTRACT

An active response network tap for use in monitoring a network comprises a first device interface terminal, a second device interface terminal, a first monitor interface terminal, and a second monitor interface terminal. A tap structure is coupled to the first device interface terminal, second device interface terminal, first monitor interface terminal and second monitor interface terminal. A memory is coupled to the tap structure and configured to store data. In one aspect, the tap structure is configured to communicate full-duplex traffic between the tap structure and a monitor device coupled to a monitor interface terminal. In another aspect, the tap structure is configured to insert data from a monitor coupled to the first monitor interface into the traffic between the first device and the second device. Advantages of the invention include the ability to provide monitor access to a network while also supporting communication with other network devices.

18 Claims, 5 Drawing Sheets

U.S. PATENT DOCUMENTS

| | | | |
|---|---|---|---|
| 5,710,846 A | 1/1998 | Wayman et al. | |
| 5,781,318 A | 7/1998 | Tremblay | |
| 5,825,775 A | 10/1998 | Chin et al. | |
| 5,983,308 A * | 11/1999 | Kerstein | 710/263 |
| 6,041,037 A | 3/2000 | Nishio et al. | |
| 6,047,321 A | 4/2000 | Raab et al. | |
| 6,108,310 A | 8/2000 | Wilkinson et al. | |
| 6,167,025 A | 12/2000 | Hsing et al. | |
| 6,272,136 B1 | 8/2001 | Lin et al. | |
| 6,366,557 B1 | 4/2002 | Hunter | |
| 6,424,627 B1 * | 7/2002 | S.o slashed.rhaug et al. | 370/241 |
| 6,449,247 B1 | 9/2002 | Manzardo et al. | |
| 6,542,145 B1 | 4/2003 | Reisinger et al. | |
| 6,650,803 B1 | 11/2003 | Ramaswami et al. | |
| 6,658,565 B1 | 12/2003 | Gupta et al. | |
| 6,687,009 B2 | 2/2004 | Hui et al. | |
| 6,687,847 B1 | 2/2004 | Aguilera et al. | |
| 6,714,976 B1 | 3/2004 | Wilson et al. | |
| 6,798,740 B1 | 9/2004 | Senevirathne et al. | |
| 6,801,940 B1 * | 10/2004 | Moran et al. | 709/224 |
| 6,823,383 B2 * | 11/2004 | MacBride | 709/224 |
| 6,836,540 B2 | 12/2004 | Falcone et al. | |
| 6,841,985 B1 | 1/2005 | Fetzer | |
| 6,850,706 B2 | 2/2005 | Jager et al. | |
| 6,882,654 B1 | 4/2005 | Nelson | |
| 6,898,630 B2 | 5/2005 | Ueno et al. | |
| 6,898,632 B2 | 5/2005 | Gordy et al. | |
| 6,925,052 B1 | 8/2005 | Reynolds et al. | |
| 6,944,437 B2 | 9/2005 | Yang et al. | |
| 6,975,209 B2 | 12/2005 | Gromov | |
| 7,027,437 B1 | 4/2006 | Merchant et al. | |
| 7,171,504 B2 | 1/2007 | Ishii | |
| 7,277,957 B2 | 10/2007 | Rowley et al. | |
| 7,308,705 B2 * | 12/2007 | Gordy et al. | 726/3 |
| 7,321,565 B2 * | 1/2008 | Todd et al. | 370/253 |
| 7,324,553 B1 * | 1/2008 | Varier et al. | 370/468 |
| 7,415,013 B1 | 8/2008 | Lo | |
| 7,430,354 B2 | 9/2008 | Williams | |
| 7,477,611 B2 | 1/2009 | Huff | |
| 7,486,624 B2 | 2/2009 | Shaw et al. | |
| 7,486,625 B2 | 2/2009 | Matityahu et al. | |
| 7,505,416 B2 | 3/2009 | Gordy et al. | |
| 7,616,587 B1 | 11/2009 | Lo et al. | |
| 7,627,029 B2 | 12/2009 | Ho et al. | |
| 7,760,859 B2 | 7/2010 | Matityahu et al. | |
| 7,788,365 B1 | 8/2010 | Foster et al. | |
| 2001/0040870 A1 | 11/2001 | Ohmori et al. | |
| 2002/0003592 A1 | 1/2002 | Hett et al. | |
| 2002/0026374 A1 | 2/2002 | Moneymaker et al. | |
| 2002/0032880 A1 | 3/2002 | Poletto et al. | |
| 2002/0061027 A1 * | 5/2002 | Abiru et al. | 370/413 |
| 2002/0073199 A1 * | 6/2002 | Levine et al. | 709/225 |
| 2002/0087710 A1 * | 7/2002 | Aiken et al. | 709/232 |
| 2002/0146016 A1 | 10/2002 | Liu et al. | |
| 2002/0176355 A1 | 11/2002 | Mimms et al. | |
| 2002/0180592 A1 * | 12/2002 | Gromov | 340/310.01 |
| 2003/0112760 A1 | 6/2003 | Puppa et al. | |
| 2003/0142666 A1 | 7/2003 | Bonney et al. | |
| 2003/0145039 A1 | 7/2003 | Bonney et al. | |
| 2003/0184386 A1 | 10/2003 | Varner et al. | |
| 2003/0215236 A1 | 11/2003 | Manifold | |
| 2004/0008675 A1 | 1/2004 | Basso et al. | |
| 2004/0023651 A1 * | 2/2004 | Gollnick et al. | 455/423 |
| 2004/0062556 A1 | 4/2004 | Kubo et al. | |
| 2004/0096227 A1 | 5/2004 | Bulow | |
| 2004/0109411 A1 | 6/2004 | Martin | |
| 2004/0120259 A1 * | 6/2004 | Jones et al. | 370/250 |
| 2004/0128380 A1 | 7/2004 | Chen et al. | |
| 2004/0190547 A1 * | 9/2004 | Gordy et al. | 370/463 |
| 2004/0202164 A1 | 10/2004 | Hooper et al. | |
| 2004/0215832 A1 * | 10/2004 | Gordy et al. | 709/250 |
| 2004/0264494 A1 * | 12/2004 | Kim | 370/448 |
| 2005/0005031 A1 * | 1/2005 | Gordy et al. | 709/250 |
| 2005/0060535 A1 * | 3/2005 | Bartas | 713/154 |
| 2005/0071711 A1 | 3/2005 | Shaw | |
| 2005/0108444 A1 | 5/2005 | Flauaus et al. | |
| 2005/0122910 A1 | 6/2005 | Parupudi et al. | |
| 2005/0129033 A1 | 6/2005 | Gordy et al. | |
| 2005/0132051 A1 | 6/2005 | Hill et al. | |
| 2005/0231367 A1 | 10/2005 | Bellantoni | |
| 2005/0257262 A1 | 11/2005 | Matityahu et al. | |
| 2005/0271065 A1 | 12/2005 | Gallatin et al. | |
| 2006/0083268 A1 | 4/2006 | Holaday et al. | |
| 2006/0083511 A1 * | 4/2006 | Edmunds et al. | 398/25 |
| 2006/0200711 A1 | 9/2006 | Schondelmayer et al. | |
| 2006/0215566 A1 | 9/2006 | Walsh | |
| 2006/0233115 A1 | 10/2006 | Matityahu et al. | |
| 2006/0282529 A1 | 12/2006 | Nordin | |
| 2007/0002754 A1 | 1/2007 | Matityahu et al. | |
| 2007/0002755 A1 | 1/2007 | Matityahu et al. | |
| 2007/0002769 A1 | 1/2007 | Matityahu et al. | |
| 2007/0064917 A1 | 3/2007 | Matityahu et al. | |
| 2007/0081549 A1 | 4/2007 | Cicchetti et al. | |
| 2007/0081553 A1 | 4/2007 | Cicchetti et al. | |
| 2007/0171966 A1 | 7/2007 | Light et al. | |
| 2007/0174492 A1 | 7/2007 | Light et al. | |
| 2007/0211682 A1 | 9/2007 | Kim et al. | |
| 2007/0213862 A1 | 9/2007 | Chang et al. | |
| 2008/0014879 A1 | 1/2008 | Light et al. | |
| 2008/0049627 A1 | 2/2008 | Nordin | |
| 2008/0214108 A1 | 9/2008 | Beigne et al. | |
| 2009/0040932 A1 | 2/2009 | Matityahu et al. | |
| 2009/0041051 A1 | 2/2009 | Matityahu et al. | |
| 2009/0168659 A1 | 7/2009 | Matityahu et al. | |
| 2009/0279541 A1 | 11/2009 | Wong et al. | |
| 2010/0146113 A1 | 6/2010 | Matityahu et al. | |

FOREIGN PATENT DOCUMENTS

| | | |
|---|---|---|
| JP | 2006148686 A | 6/2006 |
| KR | 10-2004-0058415 A | 7/2004 |
| WO | WO-02/19642 A1 | 3/2002 |
| WO | WO-2004/012163 A2 | 2/2004 |

OTHER PUBLICATIONS

"Non Final Office Action", U.S. Appl. No. 11/370,487, Mailing Date: Mar. 25, 2009.

"Non Final Office Action", U.S. Appl. No. 11/835,233, Mailing Date: Jun. 9, 2009.

HP, et al., "Reduced Gigabit Media Independent Interface (RGMII)", Nov. 30, 2005, http://web.archive.org/web/20051113015000/http://www.hp.com/md/pdfs/RGMIIv2_0_final_hp. Pdf, 9 pages total.

Wikipedia, "Field-programmable Gate Array", Jan. 21, 2005, http://web.archive.org/web/20050121193052/http://en.wi kiped ia.org/wiki/Field-programmable_gate_array, 3 pages total.

Xilinx, "LogiCore OPB Ethernet Lite Media Access Controller", v1.01b, Mar. 3, 2006, 23 pages total.

"Non Final Office Action", U.S. Appl. No. 11/370,487, Mailing Date: Jun. 11, 2009.

"International Search Report", Issued in PCT Application No. PCT/US2008/072493, Mailing Date: Feb. 13, 2009.

"Written Opinion", Issued in PCT Application No. PCT/US2008/072493, Mailing Date: Feb. 13, 2009.

"International Search Report", Issued in PCT Application No. PCT/US2008/072484; Mailing Date: Feb. 13, 2009.

"Written Opinion", Issued in PCT Application No. PCT/US2008/072484; Mailing Date: Feb. 13, 2009.

"International Preliminary Report on Patentability", Issued in PCT Application No. PCT/US2008/072484; Mailing Date: Feb. 18, 2010.

"International Preliminary Report on Patentability", Issued in PCT Application No. PCT/US2008/072493; Mailing Date: Feb. 18, 2010.

"100Base-TX/100BBase-FX Media Converters E-100BTX-FX-04 User's Guide", 23 Transitions Networks, Minneapolis, MN, Copyright 1998-2000, 4 pages.

"Replacement Statement and Explanation under 37CFR 1.915 In Support of Request for Inter Partes Reexamination of US Patent 7,486,625", Sonnenschein Nath & Rosenthal LLP, Jan. 22, 2010, 251 pages.

"Request for Inter Partes Reexamination of US Patent 7,486,625", Sonnenschein Nath & Rosenthal LLP, Dec. 18, 2009, 69 pages.

"European Search Report", Issued in EP Application No. EP 08 17 1759, Mailing Date: Jul. 31, 2009.

Gigamon Systems LLC, "GigaVUE—Product Brief", Gigamon Systems LLC, http://web.archiye.org/web/20070815021951/www.gigamon.com/pdf/GigamonSystems-OnePageProductBrief.pdf, San Jose, CA, Aug. 15, 2007, 1 page.
"Notice of Allowance and Fee(s) Due", U.S. Appl. No. 11/965,668, Mailing Date: Oct. 8, 2009.
"Non Final Office Action", U.S. Appl. No. 11/174,032, Mailing Date: Apr. 23, 2008.
"Final Office Action", U.S. Appl. No. 11/835,233, Mailing Date: Oct. 30, 2009.
"Fast Ethernet Fiber-to-Fiber Converters", Canary Communications, Inc. 7 pages total, 2004.
"Sequence Reducer/ Sequence Mirror Operator's Guide", Peribit Networks, Inc. 13 pages total, 2001-2005.
"PeriScope Central Management System (CMS) 5.0 Administrator's Guide", Peribit Networks, Inc. 13 pages total. 2003-2004.
"VSS Coppertap Literature", VSS Monitoring Inc. 2 pages, 2003-2004.
"VSS Easy Install Guide", VSS Monitoring Inc. 8 pages total. 2003-2005.
"VSS Linksafe", VSS Monitoring Inc., 1 page, 2003-2005.
"Sequence reducer/Sequence Mirror Operator's Guide", Peribit Networks, Inc. 13 pages total, 2001-2005.
"VSS Coppertap Literature PA", VSS Monitoring Inc. 2 pages. 2003-2004.
"VSS Easy Install Guide PA", VSS Monitoring Inc. 8 pages total. 2003-2005.
"VSS Linksafe PA", VSS Monitoring Inc., 1 page, 2003-2005.
"Non Final Office Action", U.S. Appl. No. 11/835,233, Mailing Date: Jun. 25, 2010.
"Application as Filed", U.S. Appl. No. 12/839,373, filed Jul. 19, 2010.
"Non Final Office Action", U.S. Appl. No. 11/835,228, Mailing Date: Sep. 9, 2010.
"Inter Partes Reexamination Office Action", U.S. Appl. No. 95/001,318, Patent in Re-examination: 7,486,625, Mailing Date: Apr. 23, 2010.
"Non Final Office Action", U.S. Appl. No. 12/705/195, Mailing Date: Dec. 27, 2010.
"Non Final Office Action", U.S. Appl. No. 12/839,373, Mailing Date: Dec. 22, 2011.
"Written Opinion", PCT Application No. PCT/US2006/25436, Mailing Date: Mar. 4, 2008.
"International Search Report", PCT Application No. PCT/US2006/25436, Mailing Date: Mar. 4, 2008.
"International Preliminary Report on Patentability", PCT Application No. PCT/US2006/25436, Mailing Date: May 22, 2008.
"International Preliminary Report on Patentability", PCT Application No. PCT/US2006/025437, Mailing Date: Jan. 17, 2008.
"International Search Report", Application No. PCT/US2006/25437, Mailing Date: Dec. 6, 2006.
"Written Opinion", Application No. PCT/US2006/25437, Mailing Date: Dec. 6, 2006.
"Non Final Office Action", U.S. Appl. No. 11/174,238, Mailing Date: Oct. 1, 2008.
"Non Final Office Action", U.S. Appl. No. 11/223,477, Mailing Date: Jun. 12, 2008.
"International Search Report", PCT Application No. PCT/US2008/080598, Mailing Date: May 26, 2009.
"Written Opinion", PCT Application No. PCT/US2008/080598, Mailing Date: May 26, 2009.
"Non Final Office Action", U.S. Appl. No. 10/834,448, Mailing Date: Mar. 4, 2009.
"Final Office Action", U.S. Appl. No. 10/834,448, Mailing Date: Dec. 9, 2009.
"Non Final Office Action", U.S. Appl. No. 10/834,448, Mailing Date: Feb. 7, 2008.
"Non Final Office Action", U.S. Appl. No. 10/834,448, Mailing Date: Feb. 18, 2010.
"Notice of Allowance and Fees Due", U.S. Appl. No. 11/925,626, Mailing Date: Jun. 18, 2010.
"Final Office Action", U.S. Appl. No. 10/834,448, Mailing Date: Aug. 3, 2010.
"International Search Report", PCT Application No. PCT/US2010/037985, Mailing Date: Dec. 31, 2010.
"Written Opinion", PCT Application No. PCT/US2010/037985, Mailing Date: Dec. 31, 2010.
"Non Final Office Action", U.S. Appl. No. 12/481,847, Mailing Date: Nov. 4, 2010.
"Final Office Action", U.S. Appl. No. 12/481,847, Mailing Date: Feb. 9, 2011.
"Final Office Action", U.S. Appl. No. 10/834,448, Mailing Date: Jun. 27, 2011.
"Non Final Office Action", U.S. Appl. No. 10/834,448, Mailing Date: Dec. 22, 2010.
"International Preliminary Report on Patentability", PCT Application No. PCT/US2008/080598, Mailing Date: Aug. 20, 2011.
"International Search Report", PCT Application No. PCT/US2011/026158, Mailing Date: Nov. 30, 2011.
"Written Opinion", PCT Application No. PCT/US2011/026158, Mailing Date: Nov. 30, 2011.
"Non Final Office Action", U.S. Appl. No. 12/839,373, Mailing Date: Jun. 7, 2012.
"Examination Report", EP Patent Application No. EP 08 17 1759, Mailing Date: Jun. 8, 2012.
"Belkin Quick Installation Guide", N1 Vision Wireless Router, Belkin International, Inc., no date, 3 pages total, 2007.
"Network Status Display", Belkin International, Inc., 2007, 1 page total.

* cited by examiner

ACTIVE RESPONSE COMMUNICATIONS NETWORK TAP

RELATED APPLICATIONS

This application claims priority to U.S. Provisional No. 60/639,004 filed Dec. 24, 2004, incorporated herein by reference.

FIELD

The present invention relates to an active response communications network tap.

BACKGROUND

Telecommunications networks are important for providing global data and voice communication. Monitoring the networks is important to ensure reliable operation, fault detection, timely mitigation of potentially malicious activities and more. Network taps are known for connecting to networks and providing a port to monitor the communication traffic on the network.

Conventional network taps enable full-duplex monitoring of network traffic over a link, but transmit the traffic to the monitoring device in two half-duplex streams, requiring specialized hardware to monitor both sides of the conversation. While this technique is useful, it does not provide full-duplex monitoring and communication, which would be extremely helpful. What's more, conventional network taps do not provide a mechanism for monitors to alert network other devices through the network. Rather, conventional network taps require that the monitoring equipment communicate with other network devices via separate communications channels. This is often a problem when other network devices are located far away from a monitor.

Consequently, there is need for an improved network tap that supports full-duplex monitoring and communication.

SUMMARY

The present invention provides an improved network tap that supports full-duplex monitoring and communication. The invention is an active response communications network tap that provides network traffic to a monitor while also permitting the monitor to insert data into the network traffic destined for other network devices.

An exemplary embodiment of an active response network tap for use in monitoring a network comprises a first device interface terminal, a second device interface terminal, a first monitor interface terminal and a second monitor interface terminal. A tap structure is coupled to the first device interface terminal, second device interface terminal, first monitor interface terminal and second monitor interface terminal. A memory is coupled to the tap structure and configured to store data from burst traffic, which is retransmitted in a first-in first-out (FIFO) technique.

In one aspect of the invention, the tap structure is configured to communicate full-duplex traffic between the tap structure and a monitor device coupled to a monitor interface terminal. In another aspect of the invention, the tap structure is configured to insert data from a monitor coupled to the first monitor interface into the traffic between the first device and the second device.

Advantages of the invention include the ability to provide full-duplex monitor access to a network in order that the network can be monitored and also that the monitor can communicate with other devices on the network.

DESCRIPTION OF THE DRAWINGS

The foregoing and other features, aspects, and advantages will become more apparent from the following detailed description when read in conjunction with the following drawings, wherein.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to Ethernet Protocol but other protocols can be used in the invention. Likewise, reference is made to packets and cells, while other forms of data and addresses can be used in the invention.

A. Architecture

Figure 1:
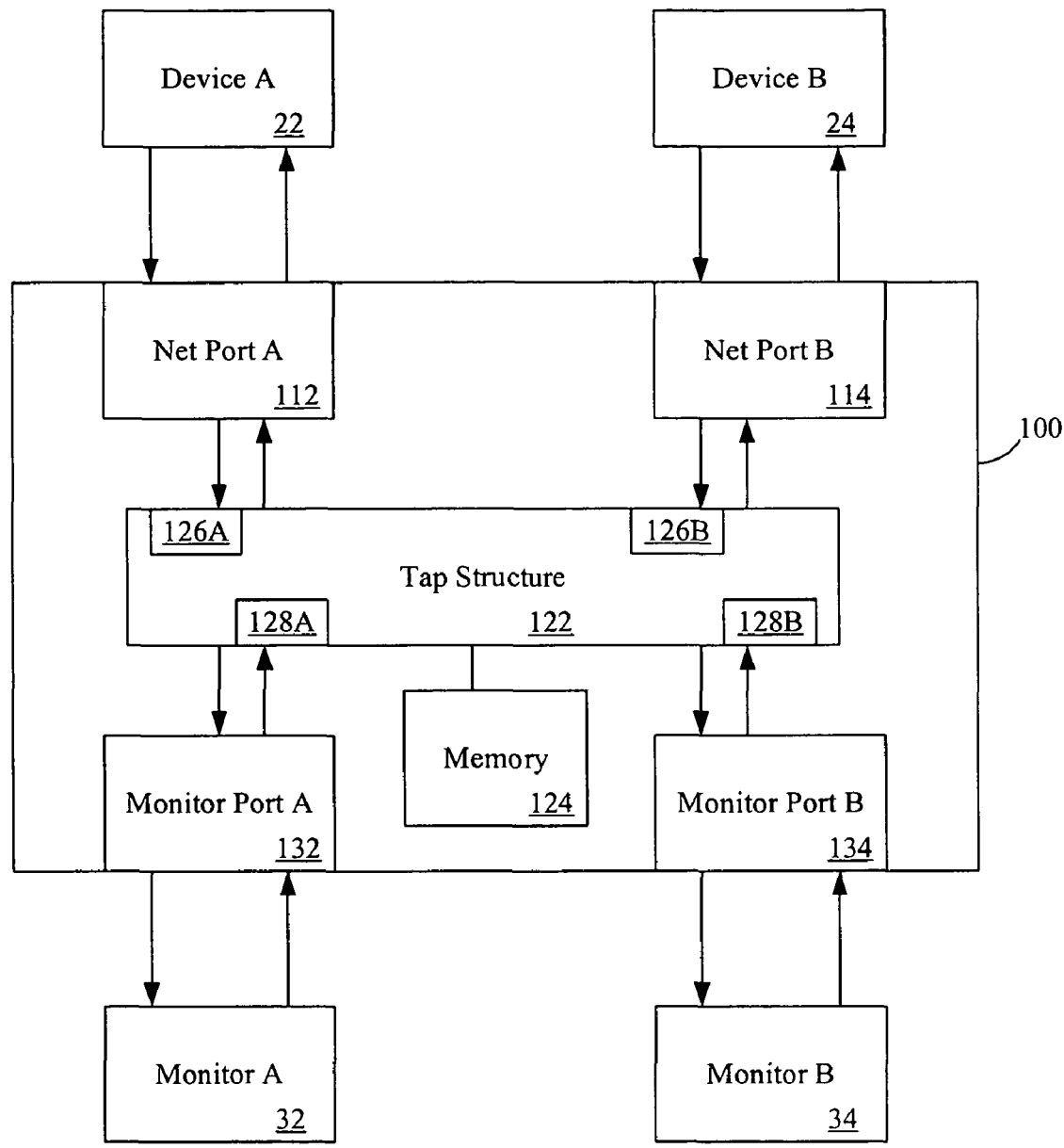
FIG. 1 depicts an active response network tap according to an embodiment of the invention.

FIG. 1 depicts an active response network tap 100 according to an embodiment of the invention. An active response network tap for use in monitoring a network comprises a first device interface terminal 112 and a second device interface terminal 114. In the exemplary embodiment, the terminals are standard RJ45 jacks that permit devices 22 and 24 to be coupled to the terminals with standard CAT5 cable. The devices 22 and 24 are typically routers, firewalls or other types of network devices. In addition, a first monitor interface terminal 132 and a second monitor interface terminal 134 are also provided and use exemplary RJ-45 jacks. Monitor devices 32 and 34 are typically devices such as intrusion detection systems (IDS), intrusion prevention systems (IPS), remote monitors, probes, analyzers and so forth that are specially designed to monitor network traffic.

A tap structure 122 is coupled to the terminals so facilitate the exchange of network traffic from the network devices 22, 24 to the network monitors 32, 34. A memory 124 is coupled to the tap structure and configured to store data. The memory is useful in the case of a data burst that exceeds the taps ability to support the network traffic, explained in more detail below.

The network monitors 32, 34 can observe the network traffic via the switch 122 and can then report to other systems or computers regarding a number of traffic parameters. For example, a monitor can report the network bandwidth, number of packets or messages across the network, the frequency of different packet types, origins and destinations and so forth. A network monitor can also detect the presence of malicious traffic, for example, intent on creating a denial of service condition by flooding the network with traffic destined for a particular server. In such a case, a monitor may alert a firewall or other network device to mitigate or terminate traffic to or from a particular computer or server. Conventional monitors send instructions to network devices via a separate independent network. While this may be the only way to communicate in total fault conditions, it's burdensome in most situations.

The invention provides that the monitor can communicate back into the network traffic by full-duplex communication. In one aspect of the invention, the tap structure 122 is configured to communicate full-duplex traffic between a first device coupled to the first interface terminal and a second device coupled to the second interface terminal. The tap structure is configured to insert data from a monitor coupled to the first monitor interface into the traffic between the first device and the second device.

B. Operation

The present invention advantageously provides a passive active response dual port aggregator tap aggregates traffic from both sides of a full-duplex link and simultaneously sends the stream to two separate network interface cards (NIC). The Active Response feature enables the ability to inject responses to any network event. An exemplary embodiment operates at 10 Mega bits per second (Mbps) or 100 Mbps, often denoted as 10/100, but can also operate at higher frequencies, e.g. 1 Gig, 1000 Mbps.

The invention seamlessly combines these two streams using a first-in first-out technique, enabling full-duplex monitoring with one NIC. The dual-port aggregator tap structure 122 regenerates and sends the combined stream to two separate NICs, enabling simultaneous monitoring of the same full-duplex link with two devices. The Port Aggregator in tap 122 takes two streams and aggregates them into one stream. In one aspect, the invention provides that Monitor A can inject data into the network traffic while Monitor B is a passive monitor and the Monitor Port B is not configured to permit Monitor B to inject data into the network traffic. In another aspect, the invention provides that Monitor Port A and Monitor Port B can inject data into the network traffic. The most current Port Aggregator has two output ports so that two monitoring devices can be attached. Only one of the output ports can inject traffic back to the main network.

The invention supports different types of active responses. With an active response dual port aggregator tap, an administrator can transmit any type of Ethernet packet back into the original link, supporting all common types of active responses generated by intrusion detection systems, and by intrusion prevention systems deployed in passive mode. The most common response types are Transmission Control Protocol (TCP) resets, and firewall rule changes. While the tap can support both types of responses, caution is recommended in dynamically updating firewall rules due to the risk of disabling network services. Because most firewalls are managed out-of-band, however, it is unlikely that the regeneration tap will be part of a rule change scenario.

Figure 2A:
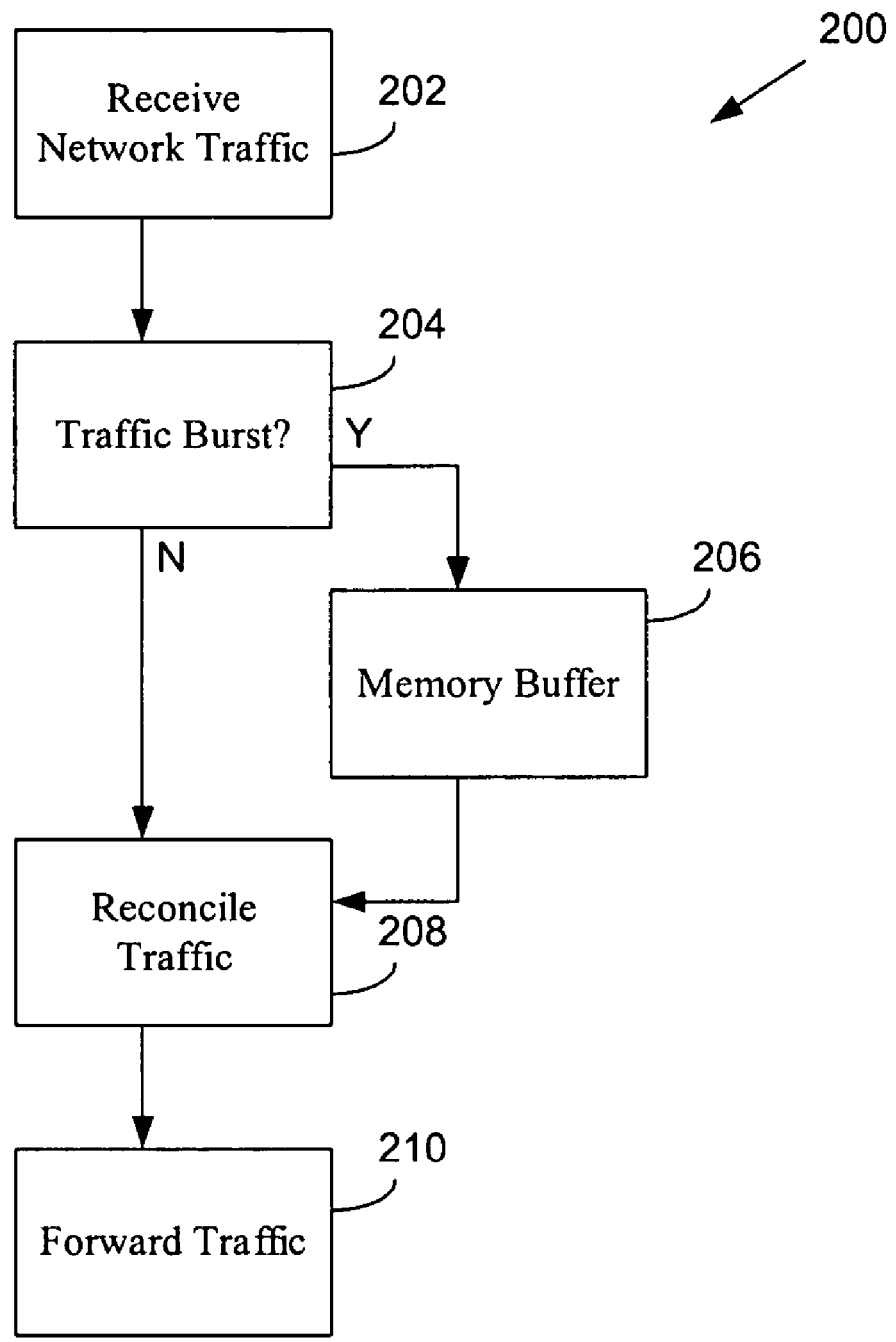
FIGS. 2A-B depict flowcharts showing steps for performing methods according to embodiments of the invention.
Figure 2B:
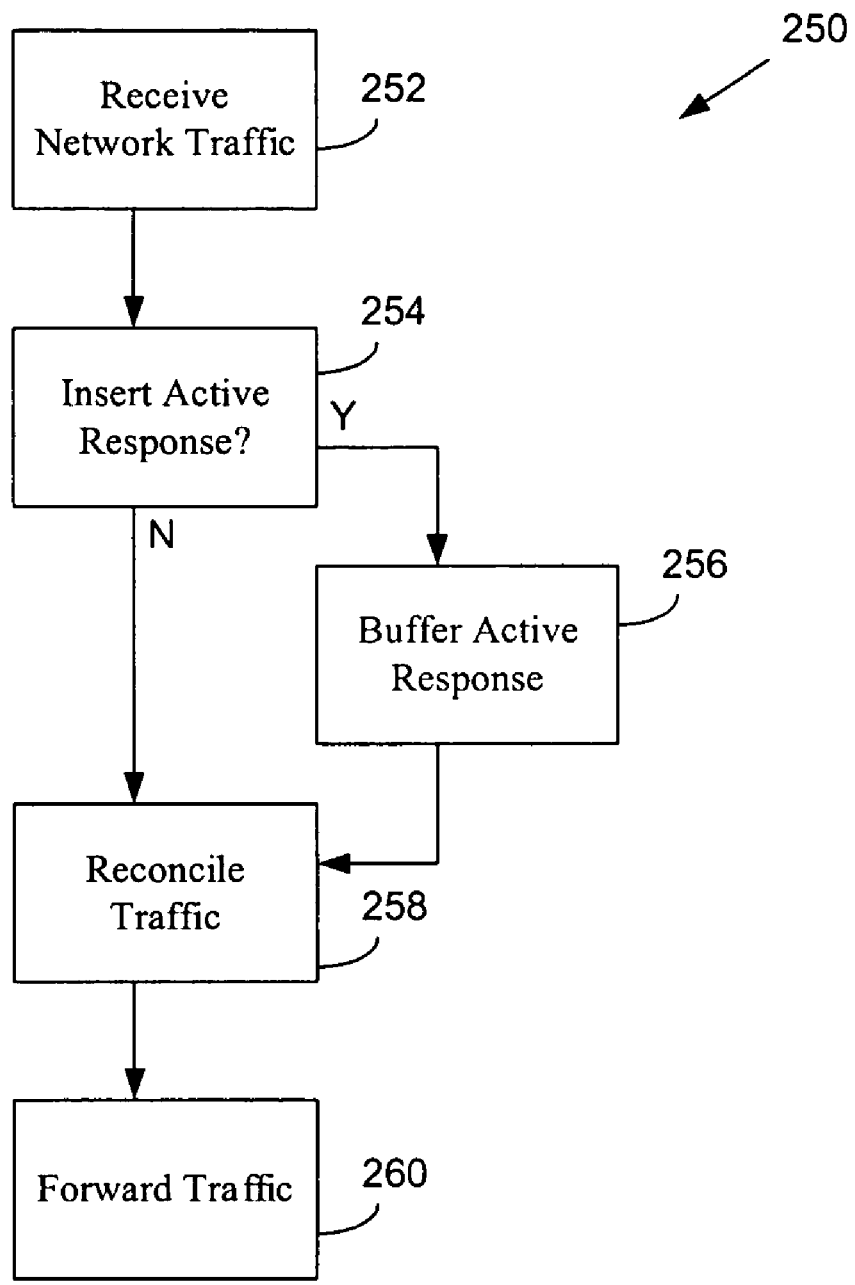

The invention is designed to avoid collisions when active responses are transmitted back into the original link. On each side of the full-duplex link, there is a small buffer for traffic arriving from the network 126A, 126B, and another small buffer for active response traffic arriving from the monitoring device 128A, 128B. Traffic is released from this buffer pair on a first-in, first-out basis, which is part of the reconcile traffic step (FIG. 2B step 258). If both sides of the buffer are empty and a packet originating from the monitoring device and a packet originating from the network arrive at the same time, priority is given to the network packet.

The invention is designed to support high bandwidth on an active response port: The average amount of bandwidth for active responses is determined by the average available capacity on the link. For example, on a 100 Mbps full-duplex link, if transmission from device A to device B averages 30 Mbps, and transmission from device B to device A averages at 50 Mbps, then there is an average capacity on the first side for 70 Mbps, and on the second side for up to 50 Mbps of active response traffic. At any particular point in time, actual capacity is determined by the size of the packets being transmitted and the gap between these packets. On a standard link with 64-byte network and active response traffic, the capacity at any point in time will be very close to the average capacity. As the most common use for the tap will be to inject TCP resets, which are standard 64-byte packets, it is unlikely that the transmissions from either side of the active response port will exceed 10 Mbps, even if many sessions are terminated in a short time frame. In our internal testing, we have therefore focused on active response port performance at up to 10 Mbps.

The connected monitor should have a MAC and IP address to function properly when the active response port is operating in active mode. These are not needed when this port is set to passive mode. The tap itself does not typically include a MAC or IP address, regardless of how the active response port is set. However, a MAC or IP address can be incorporated into the invention to facilitate communications for the monitor to provide active response.

The invention is designed for 10/100 networks where the "receive" capacity of the network interface card (NIC) is greater than the average capacity required to monitor both sides of the full-duplex link. For example, on a 100 Mbps link with 30 percent utilization on each side, a 100 Mbps NIC can easily handle the 60 Mbps traffic from the tap.

For cases where the NIC's capacity is exceeded—for instance, if there is a traffic burst, and the 100 Mbps NIC is now receiving 140 Mbps of traffic-port buffering is provided as an additional innovative feature to help prevent data overload. Memory 124 provides a buffered memory that handles an overflow, for example, up to 0.5 megabytes per side of the full-duplex connection. This memory clears automatically once the NIC's utilization is again below 100 percent.

Using buffering, the invention can transmit any type of Ethernet packet, from a simple Transmission Control Protocol (TCP) reset to complex Internet Control Message Protocol (ICMP) messages, back into the original network link. This technique is described with reference to FIGS. 3A-C, which depict communication traffic examples showing data rates and memory buffer techniques according to embodiments of the invention.

Figure 3A:
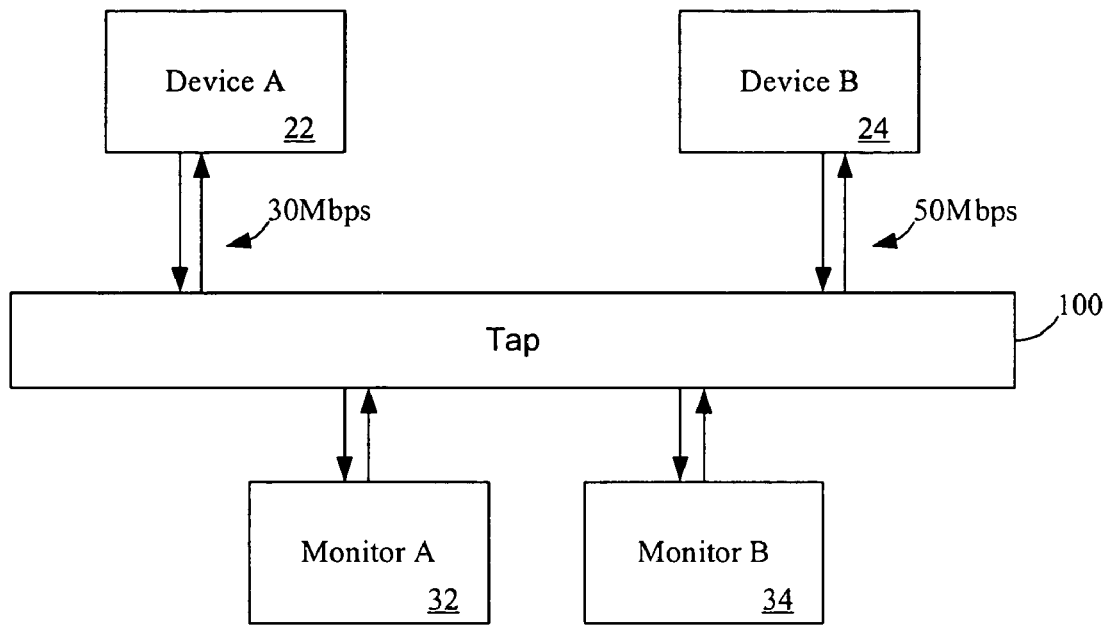
FIGS. 3A-C depict communication traffic examples showing data rates and memory buffer techniques according to embodiments of the invention.
Figure 3B:
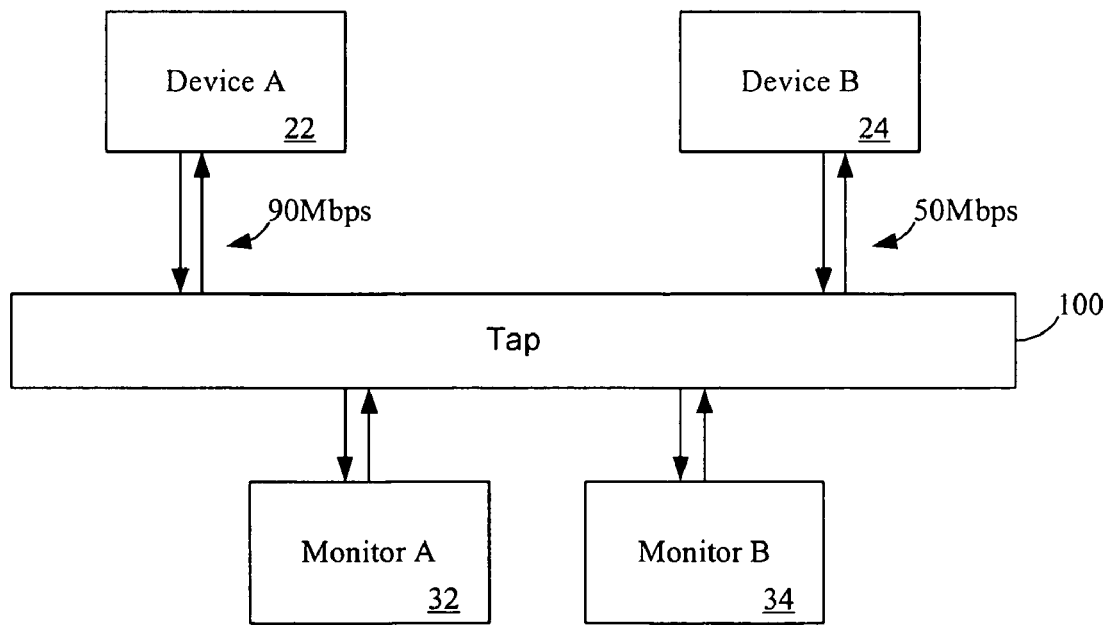
Figure 3C:
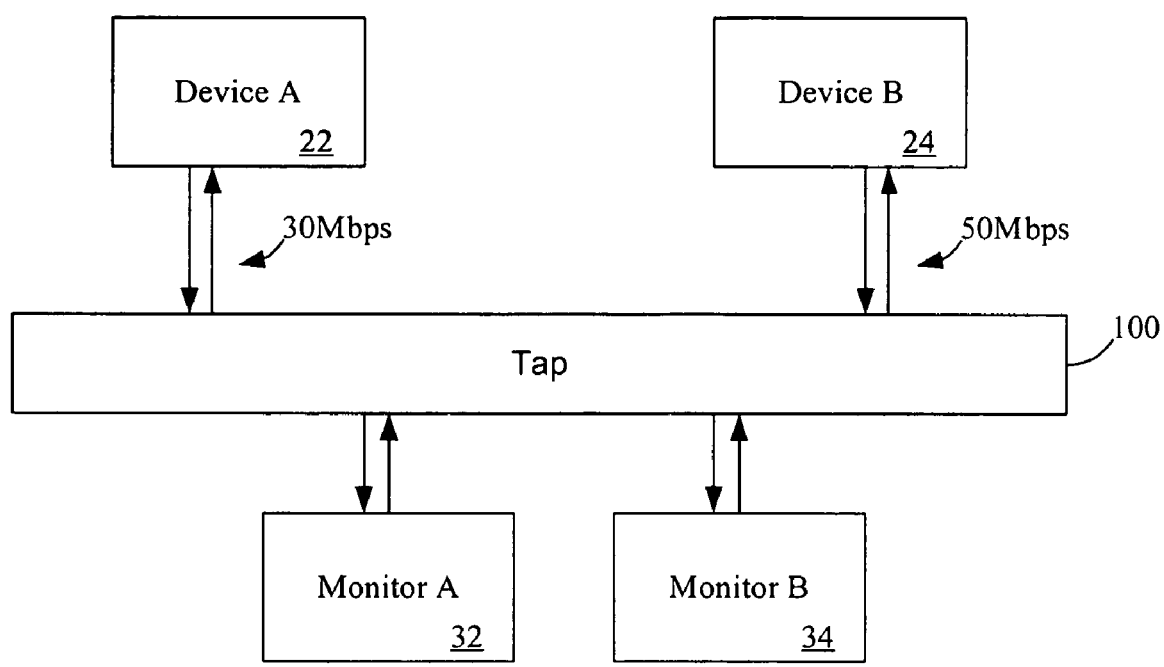

Traffic that passes through the tap 100 is sent to the monitoring device NIC on a first-in, first-out basis, including traffic that is temporarily stored in memory. If two packets enter at the same time then one packet is processed while the other is stored briefly in memory, preventing collisions. When there is a burst of data, traffic in excess of the NIC's capacity is sent to the tap's memory 124. In one aspect, up to one megabyte of data per side of the full-duplex stream can be stored in memory. Memory continues to fill until its capacity is reached, or the burst ends—whichever comes first. In both cases, the tap applies a first-in, first-out procedure, processing stored data before new data from the link. If memory fills before the burst ends, the memory stays filled as the stored data is processed—data that leaves the buffer is immediately replaced. If the burst ends before the memory fills, the memory clears until the full megabyte of capacity is available, or another until another burst in excess of the NIC's capacity requires additional memory. FIGS. 3A-C illustrate an example of a 100 Mbps NIC moving from 80 percent utilization, to 140 percent utilization, then back to 80 percent utilization.

FIG. 3A depicts a 100 Mbps link where Side A is at 30 Mbps and Side B is at 50 Mbps. The NIC receives 80 Mbps of traffic (80% utilization), so memory is not required for the monitoring device NIC to process all full-duplex traffic. Using a single NIC each, both monitoring devices receive all combined traffic from Side A and Side B, including physical layer errors.

FIG. 3B depicts a burst of traffic, so Side A is now at 90 Mbps while Side B remains at 50 Mbps. The NIC's utilization is at 140%, requiring the use of memory to help prevent data loss. Using a single NIC each, both monitoring devices receive all combined traffic from Side A and Side B, including physical layer errors. The extra 40 Mbps of traffic is stored in the memory 124 buffer from Port A (e.g. 1 megabyte memory). Memory continues to fill until the buffer capacity is reached, or the burst ends. A separate buffer is also available to handle a burst on Port B (e.g. 1 megabyte memory).

FIG. 3C depicts where Side A is again at 30 Mbps and Side B remains at 50 Mbps. The NIC's utilization returns to 80%. The tap applies a first-in, first-out process to all packets. Once the burst has ended and the NIC's utilization is again below 100 percent, the tap first processes the packets that were stored in memory. As long as the NIC's utilization remains below 100 percent, this process continues uninterrupted until the memory clears. Once the memory has cleared, the monitoring devices begin receiving new data directly from the link. Using a single NIC each, both monitoring devices again receive all traffic from Side A and Side B, including physical layer errors.

C. Conclusion

Advantages of the invention include the ability to provide full-duplex monitor access to a network in order that the network can be monitored and also that the monitor can communicate with other devices on the network.

Having disclosed exemplary embodiments and the best mode, modifications and variations may be made to the disclosed embodiments while remaining within the subject and spirit of the invention as defined by the following claims.

The invention claimed is:

1. An active response network tap for use in monitoring a network, the active response network tap comprising:
   a first device interface terminal;
   a second device interface terminal;
   a first monitor interface terminal;
   a second monitor interface terminal;
   a tap structure coupled to the first device interface terminal, the second device interface terminal, the first monitor interface terminal, and second monitor interface terminal; and
   a memory coupled to the tap structure and configured to store data,
   wherein the tap structure is configured to communicate first full-duplex traffic between the tap structure and a first monitor, the first monitor coupled to the first monitor interface terminal,
   the tap structure is further configured to communicate second full-duplex traffic between the tap structure and a second monitor, the second monitor coupled to the second monitor interface terminal,
   the tap structure is further configured to provide bandwidth priority to a network packet over a response packet if the network packet and the response packet arrive at the active response network tap at the same time, wherein the response packet is buffered and transmitted in a manner that yields the bandwidth priority to the network packet, the network packet originating from the network, the response packet originating from at least one of the first monitor and the second monitor;
   wherein the tap structure is further configured to aggregate a first data stream received from the first device interface terminal and a second data stream received from the second device interface terminal to generate a combined data stream, and
   the tap structure is further configured to simultaneously send a first copy of the combined data stream to the first monitor through the first monitor interface terminal and a second copy of the combined data stream to the second monitor through the second monitor interface terminal.

2. The active response network tap of claim 1, wherein:
   the tap structure is configured to communicate third full-duplex traffic between a first device coupled to the first device interface terminal and a second device coupled to the second device interface terminal,
   the tap structure is disposed between the first device interface terminal and the first monitor interface terminal, and
   the tap structure is disposed between the second device interface terminal and the second monitor interface terminal.

3. The active response network tap of claim 1, wherein:
   the tap structure is configured to insert data from the first monitor into traffic between a first device coupled to the first device interface terminal and a second device coupled to the second device interface terminal.

4. The active response network tap of claim 1, wherein:
   the first monitor interface terminal is configured to inject data into traffic between a first device coupled to the first device interface terminal and a second device coupled to the second device interface terminal, and
   the second monitor interface terminal disallows the second monitor to inject any data into the traffic.

5. The active response network tap of claim 1, wherein:
   the first monitor interface terminal is a first RJ-45 jack, and the second monitor interface terminal is a second RJ-45 jack.

6. The active response network tap of claim 1, wherein:
   the active response network tap has an Internet Protocol address.

7. The active response network tap of claim 1, wherein:
   the tap structure is configured to provide traffic associated with the first device, traffic associated with the second device, and physical layer errors to the first monitor, and
   the tap structure is configured to provide the traffic associated with the first device, the traffic associated with the second device, and the physical layer errors to the second monitor.

8. The active response network tap of claim 1 further comprising a buffer pair, the buffer pair including a first buffer and a second buffer, the first buffer being configured to buffer first data traffic, the first data traffic arriving from at least one of the first device interface terminal and the second device interface terminal, the second buffer being configured to buffer second data traffic, the second data traffic arriving from at least one of the first monitor interface terminal and the second monitor interface terminal, traffic being released from the buffer pair on a first-in, first out basis.

9. A method of monitoring network traffic using a tap comprising a first device interface terminal, a second device interface terminal, a first monitor interface terminal, a second monitor interface terminal, a tap structure coupled to the terminals, and a memory coupled to the tap structure, the method comprising:

communicating first full-duplex traffic between a first device coupled to the first device interface terminal and a second device coupled to the second device interface terminal;

communicating second full-duplex traffic between the tap structure and a first monitor, the first monitor coupled to the first monitor interface terminal;

communicating third full-duplex traffic between the tap structure and a second monitor, the second monitor coupled to the second monitor interface terminal;

providing bandwidth priority to a network packet over a response packet if the network packet and the response packet arrive at the active response network tap at the same time, wherein the response packet is buffered and transmitted in a manner that yields the bandwidth priority to the network packet, the network packet originating from the network, the response packet originating from at least one of the first monitor and the second monitor;

aggregating a first data stream received from the first device interface terminal and a second data stream received from the second device interface terminal to generate a combined data stream; and simultaneously sending a first copy of the combined data stream to the first monitor through the first monitor interface terminal and a second copy of the combined data stream to the second monitor through the second monitor interface terminal.

10. The method of claim 9, further comprising the step of:

inserting data from the first monitor coupled to the first monitor interface into the first full-duplex traffic between the first device and the second device.

11. The method of claim 9, wherein:

the first monitor interface terminal is an RJ-45 jack.

12. The method of claim 9, further comprising:

injecting data from one of the first monitor and the second monitor into the first full-duplex traffic through the first monitor interface terminal; and disallowing the second monitor to inject any data through the second monitor interface terminal into the network traffic.

13. The method of claim 9, wherein:

the tap structure is disposed between the first device interface terminal and the first monitor interface terminal, and the tap structure is disposed between the second device interface terminal and the second monitor interface terminal.

14. The method of claim 9, wherein:

the first monitor has an Internet Protocol address.

15. The method of claim 9, wherein:

the tap has an Internet Protocol address.

16. The method of claim 9, further comprising:

inserting a Transmission Control Protocol reset from the first monitor into the first full-duplex traffic.

17. The method of claim 9, further comprising:

inserting an Internet Control Message Protocol message from the first monitor into the first full-duplex traffic.

18. The method of claim 9 further comprising:

releasing traffic from a buffer pair on a first-in, first out basis, wherein the buffer pair includes a first buffer and a second buffer, using the first buffer to buffer first data traffic, the first data traffic arriving from at least one of the first device interface terminal and the second device interface terminal;

using the second buffer to buffer second data traffic, the second data traffic arriving from at least one of the first monitor interface terminal and the second monitor interface terminal; and providing the priority to the network packet over the response packet when both the first buffer and the second buffer are empty.

* * * * *